Aug. 24, 1926.
F. G. LEWIS
1,597,382
WHEELED SCRAPER
Filed Dec. 22, 1924  2 Sheets-Sheet 1
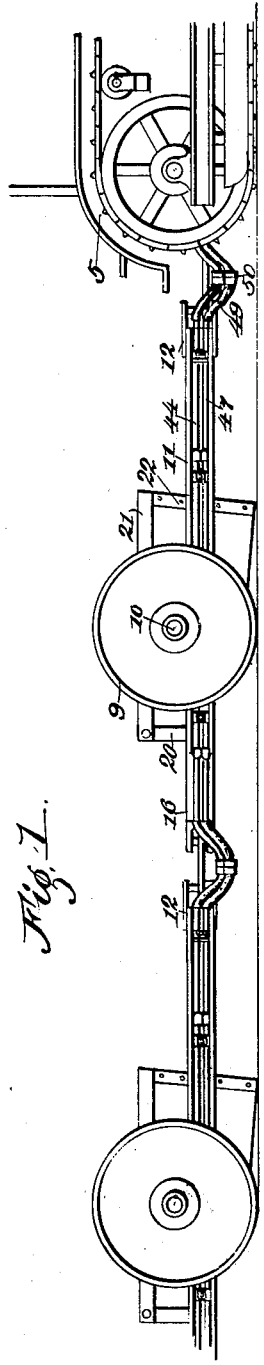
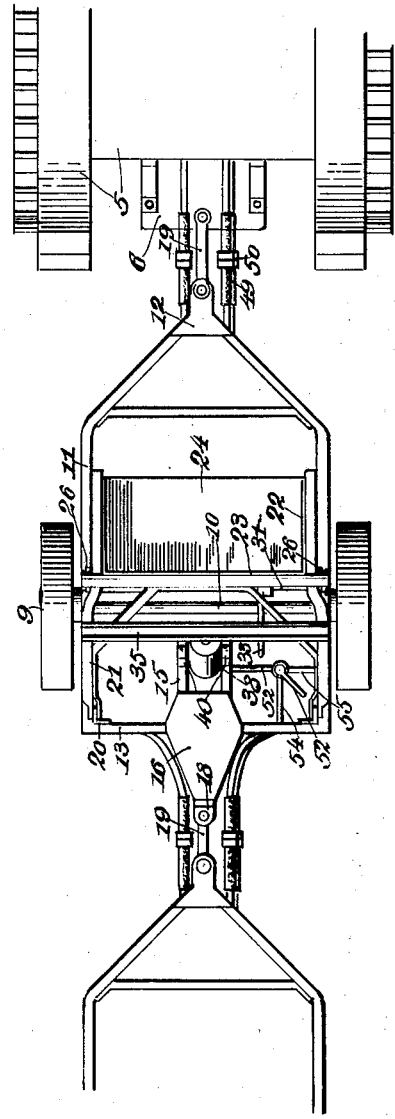
Inventor
Fredrick G. Lewis
By J. Mc. St. John
Attorney Aug. 24, 1926. 1,597,382
F. G. LEWIS
WHEELED SCRAPER
Filed Dec. 22, 1924 2 Sheets-Sheet 2
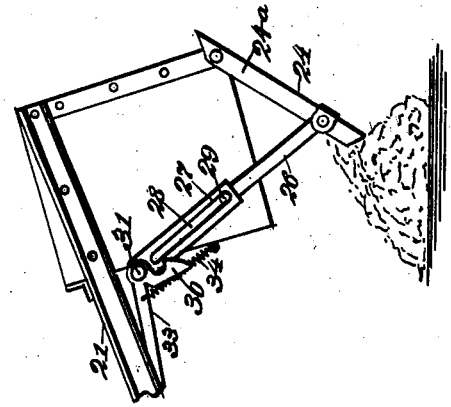
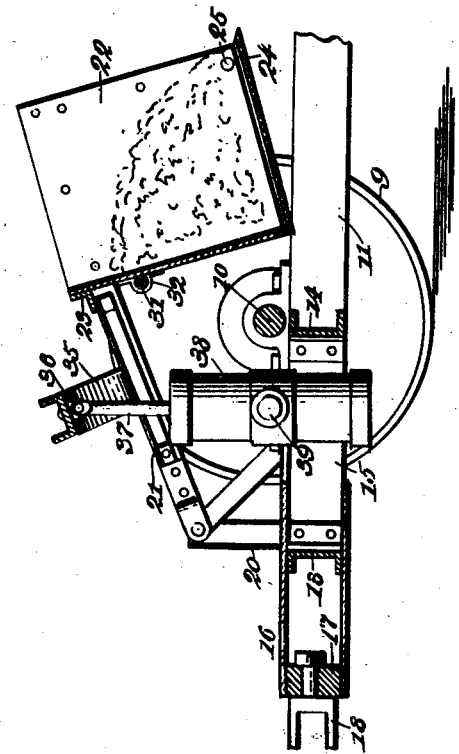
Inventor
Fredric G. Lewis
By J. Mc. H. John
Attorney Patented Aug. 24, 1926.

1,597,382

UNITED STATES PATENT OFFICE.

FREDRICK G. LEWIS, OF ST. LOUIS, MISSOURI, ASSIGNOR TO LA PLANT-CHOATE MANUFACTURING CO., OF CEDAR RAPIDS, IOWA.

WHEELED SCRAPER.

Application filed December 22, 1924. Serial No. 757,574.

This invention relates to scrapers such as are used in road grading, and excavating work of that nature, singly, or in gangs or trains, and the object of the invention is to provide for the more convenient and efficient management of such scrapers in loading, transporting the load, and dumping the same.

The invention comprises improved mounting and carrying apparatus and dumping means, and a hydraulic lift for the scraper, whereby it may be easily and very quickly elevated to a position for carrying the load, even while moving forward, and against heavy resistance.

The invention is fully disclosed in the description and claims following, reference being had to the accompanying drawings, in which:—

Fig. 1 is a side elevation illustrating two scrapers entrain, and attached to the rear of a tractor. Fig. 2 is a plan view in part of what is shown in Fig. 1. Fig. 3 is a central, longitudinal section in a vertical plane of one of the improved scrapers as loaded and with the load elevated for transportation. Fig. 4 shows the scraper in the act of dumping the load. Fig. 5 is a plan view illustrating conventionally the hydraulic lifting jack and the apparatus for supplying it with liquid under pressure, and releasing the same.

In the drawing, the numeral 5 denotes a tractor of the creeper type, provided at its rear with a draw-bar plate 6. The tractor is also supposed to carry an oil-tank 7 and a pressure pump 8 for the same, not shown in Figs. 1 or 2, but clearly indicated in Fig. 5. This is a part of the regular equipment of the tractor partly illustrated, the tractor supplying the necessary power for operating the pump. The scraper now to be described is designed for attachment to a tractor capable of supplying liquid under pressure to a hydraulic jack, whether of this, or other general type.

A pair of strong, broad-tired wheels 9 is provided with an axle 10, and on this is hung a strong steel frame to support the scraper and its operating mechanism. The frame as herein shown comprises a pair of side sills 11, which at the forward end converge and connect with a coupler head 12. At the rear the sills connect with a cross-beam 13, and a similar beam 14 connects them near the axle. A pair of shorter cross-beams 15, spaced apart, connect the cross-beams 13 and 14. A rearwardly extending coupler head is formed of two top and bottom plates 16 secured to the frame sills, and has a rear block 17 holding the swiveled coupler 18. Draw-bars 19 serve to link any desired number of the scrapers in a train and to the operating tractor. The rear corners of the frame are provided with posts 20, suitably braced, and to these the supporting arms 21 of the scraper, 22, are pivoted. The scraper 22 is in the nature of a scoop, substantially rectangular, and open at the top and front. This is riveted to the sidearms and to a connecting cross-bar 23, which is also suitably braced. The bottom of the scoop, 24, is hinged to the sides at 25 by its upturned sides 24ª. Normally it is held in closed position by links 26 sliding in pivoted guides 27, which are slotted at 28 for the movement of studs 29. These serve to limit the swing of the bottom in dumping, and when in normal position are held by hooks 30 attached to a rock-shaft 31 mounted in bearings 32 at the back of the scoop. A hand lever 33 serves for disengaging the hooks to dump the load, and a spring 34 restores them to engaging position. The hooking of the bottom in working position is automatic. When the scoop is depressed the bottom, resting on the ground, is brought to nearly final position, and is forced to such position by the pressure of excavating.

An arched bridge 35 connects the scoop arms, and to lugs 36 is pivoted the piston-rod 37 of a hydraulic jack 38. This has lateral trunnions 39 mounted in bearings 40 on the beams 15. Liquid forced powerfully into the bottom end of the jack cylinder carries the internal piston upwardly, and so elevates the scoop, as shown in Fig. 3.

The preferred liquid for the jack is oil, and a simple manner of applying it is shown in Fig. 5. A sufficient supply of oil is held in a tank 7 on the tractor, as above mentioned. A pipe 42 leads from this to a force-pump 8, having connection with a pipe-line consisting of a pressure-pipe 44 and a pressure-limiting by-pass 45. The latter is provided with a suitable valve 46, which permits the liquid to flow back to the tank when the pressure from the pump exceeds a predetermined limit. A return pipe 47 restores the oil used by the jack to the tank. The circulation is carried to any number of scrapers by piping each scraper, the pipes being shown as conveniently disposed in the channels of the frame sills. The ends of the pipes, front and rear, are preferably brought near the couplings (to facilitate turning), and are provided with flexible terminals 49, with their couplings 50. Each line pipe is also provided with a valve 51, whereby the flow of oil may be stopped at the rear of any scraper. If a train of them is employed, only the rearmost valves are closed. Each jack connects with a three-way valve 52 by a hose 53, and the valve connects with the pressure and release pipes by branches 54 and 55, respectively. Pressure is maintained in the one line by the continuous action of the pump, and a turn of the three-way valve delivers the pressure to the jack to lift the scoop. A reverse turn releases the oil into the return pipe, and the parts descend by gravity. Both the valve lever and the load-dumping lever are within easy access of the operator, who is supposed to stand on the platform made by the rear coupling head.

The natural order in loading and operating the scoops in a train is from front to rear, but the apparatus admits of the operation in any desired order. It is also to be noted that by moving the three-way valve back and forth more or less rapidly the scoop will be vibrated up and down, and thus be shaken free from any material inclining to stick to it.

The quick lift of the jack makes it possible to load and elevate the scoops with no slowing or stopping of the tractor, and with a considerable train of scrapers the rapid excavation of large masses of earth is accomplished, with little manual labor.

It will be evident that the whole thrust of the scraper while at work is borne by the rearwardly extending arms rigidly secured to it near the top. The pivoting of the arms to the frame is such with relation to the cutting parts of the scraper, that the latter, as it moves forwardly, is forced to dig, and this action is very desirable, especially in hard earth. Any excess of tendency in this direction can be easily controlled by the lift of the hydraulic jack. The swing of the scoop is a simple arc, which is just the movement desired, as it brings the scoop to the tilted, carrying position, and well elevated, so as to dump easily on a level or on a heap.

Having thus described my invention, I claim:

1. In a wheeled scraper, a fixed supporting frame, a scoop pivoted rearwardly thereto, a hydraulic jack carried by the frame, and means connecting the jack liftably with the scoop.

2. In a wheeled scraper, a fixed supporting frame, a scoop having rearwardly extending arms pivotally connecting with the frame, a connecting bridge for said arms, a hydraulic jack carried by the frame, and means connecting the jack with said bridge.

3. In a wheeled scraper having a fixed supporting frame, thrust-arms pivoted rearwardly thereto, a scoop rigidly attached to said arms, a hydraulic jack mounted rockably on the frame, and a thrusting connection of its piston with said scoop.

4. In a wheeled scraper having a fixed supporting frame, thrust-arms pivoted rearwardly thereto, a scoop rigidly attached to said arms, a hydraulic jack mounted rockably on the frame below said arms, and having a thrusting connection of its piston with said scoop.

5. In a wheeled scraper having a fixed supporting frame, thrust-arms pivoted rearwardly thereto, a scoop rigidly attached to said arms, a hydraulic jack mounted below said arms and having a thrusting connection of its piston with said scoop, and pipes carried by the frame and adapted to supply liquid under pressure to said jack.

6. In a wheeled scraper having a supporting frame, a tilting scoop mounted thereon, and a hydraulic jack connecting operably with said scoop, a liquid-pressure pipe carried by the frame, front and rear flexible extensions thereof, means for coupling them in a train, and valved pipes leading from the main line to said jack.

7. In a wheeled scraper having a supporting frame, a tilting scoop carried thereby, a lifting hydraulic jack connecting operably with said scoop, a liquid-pressure pipe carried by the frame, and provided with flexible terminals front and rear, an auxiliary, non-pressure release pipe, and a valved connection of the jack with both the pressure and the release pipe line.

8. In combination with means for supplying liquid under pressure, a wheeled scraper having a tilting scoop, a supporting frame therefor, a co-operating hydraulic jack carried by the frame, a pressure pipe carried by the frame, valved connection of the jack therewith, and means adapted to connect with the source of pressure at the front, and to close the pressure line at the rear.

9. In a wheeled scraper, a supporting frame, a tilting scoop carried thereby, a forwardly hinged bottom for said scoop, rearwardly connecting links therefor, hooks to engage the links in operative position, a rock-shaft carrying said hooks, and a releasing lever attached to said shaft.

10. In a wheeled scraper, a supporting frame, a scoop carried by rearwardly extending arms pivoted to the frame, a dumping bottom for the scoop pivoted forwardly and at a point higher than its cutting edge when working, rearward links adapted to support the bottom in working position, and to limit the drop thereof, hooks to engage said links in the supporting position, and means for manually releasing said hooks.

In testimony whereof I affix my signature.

FREDRICK G. LEWIS.